June 30, 1959     W. K. SMITHSON     2,892,562
FOLDABLE CAGE CONSTRUCTION
Filed Nov. 27, 1956     4 Sheets-Sheet 1
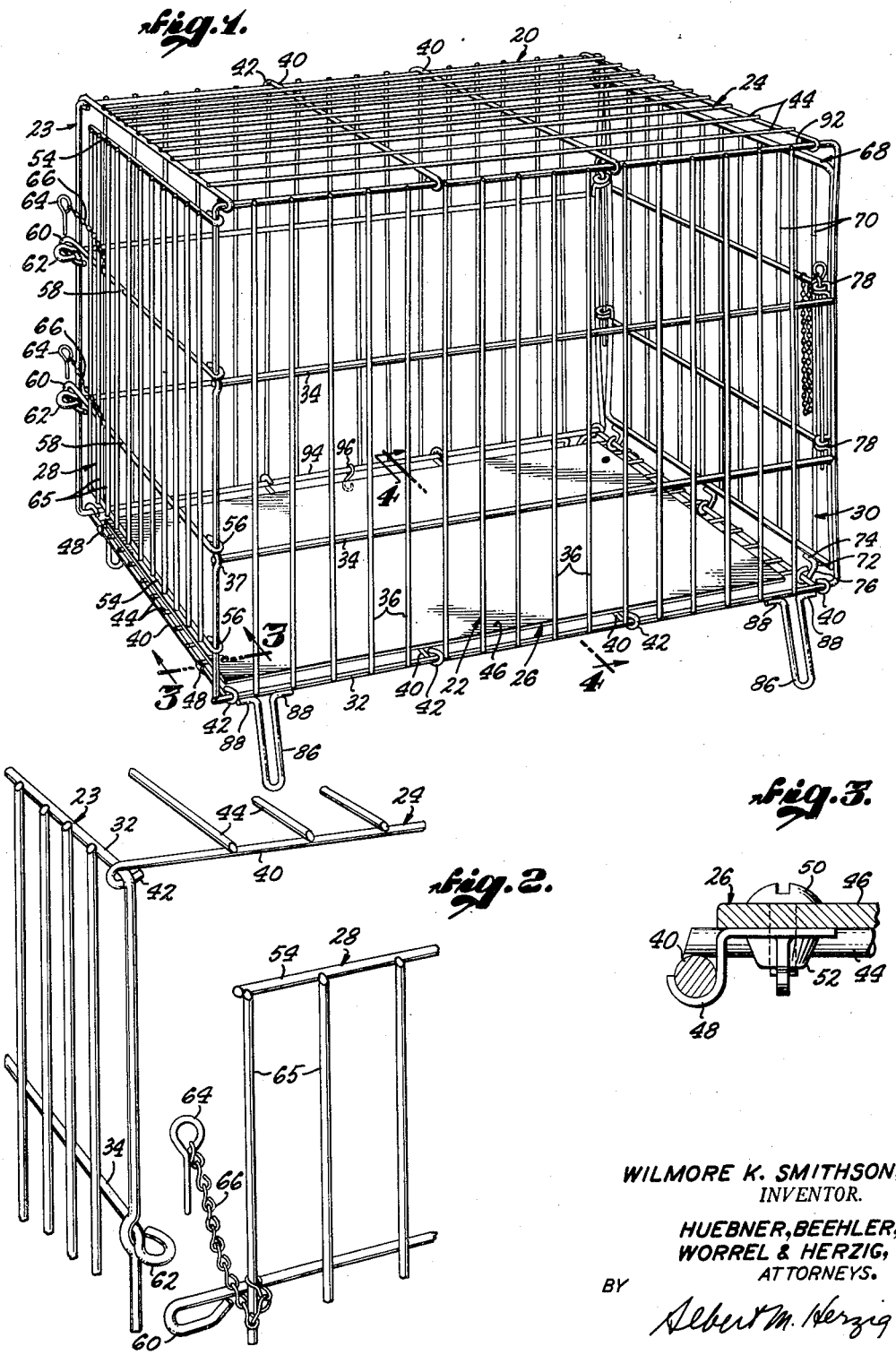
WILMORE K. SMITHSON,
INVENTOR.
HUEBNER, BEEHLER,
WORREL & HERZIG,
ATTORNEYS.

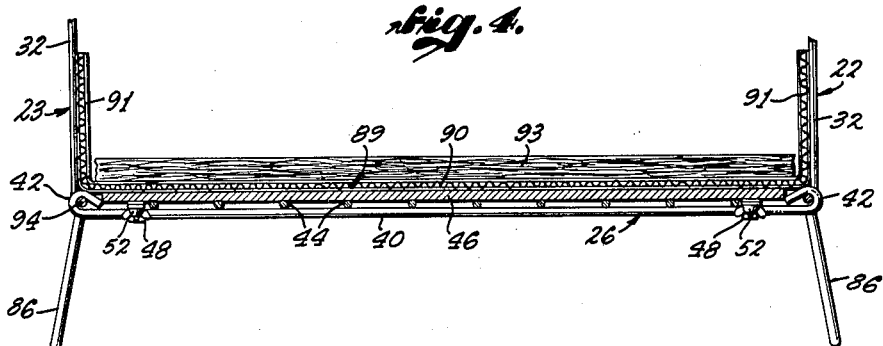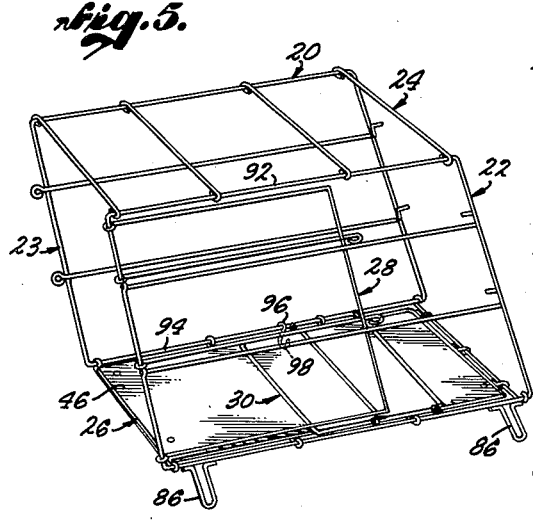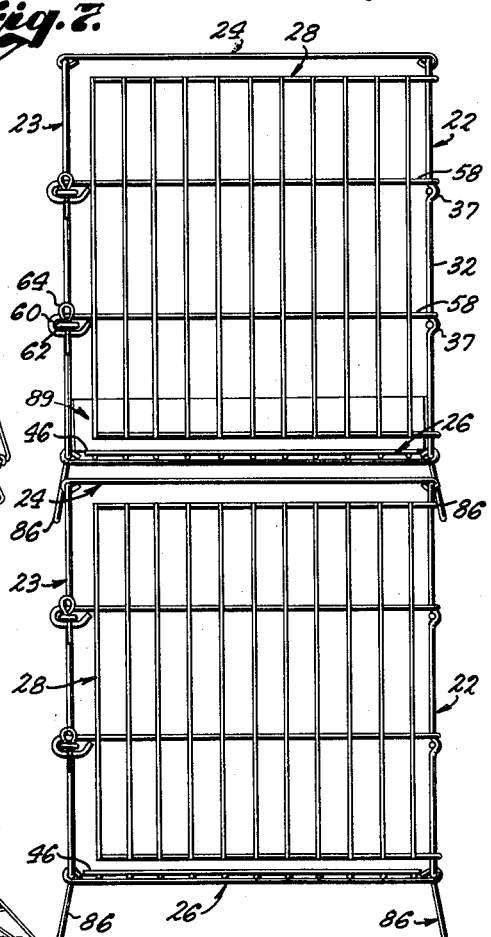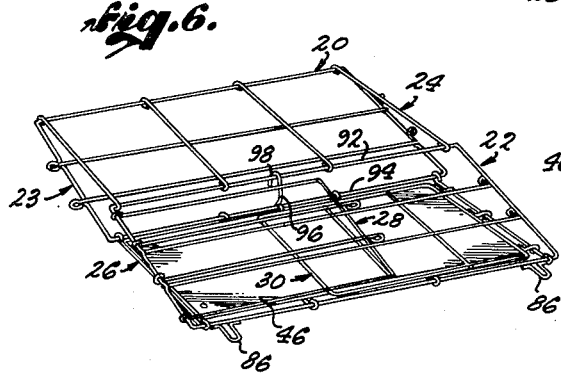

June 30, 1959 — W. K. SMITHSON — 2,892,562
FOLDABLE CAGE CONSTRUCTION
Filed Nov. 27, 1956 — 4 Sheets-Sheet 3
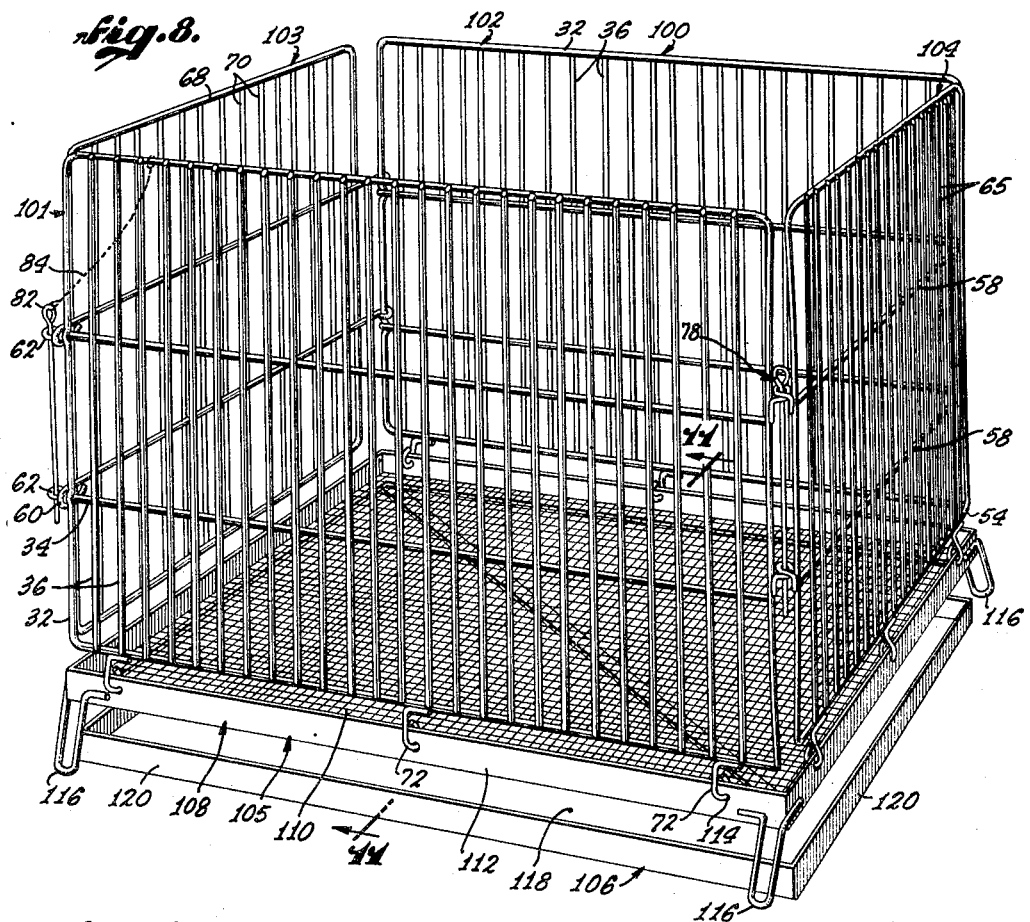
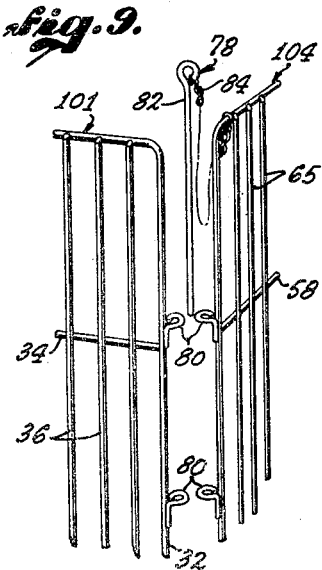
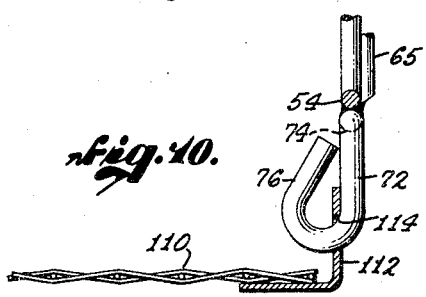
WILMORE K. SMITHSON,
INVENTOR.
HUEBNER, BEEHLER,
WORREL & HERZIG,
ATTORNEYS.
BY Albert M. Herzig

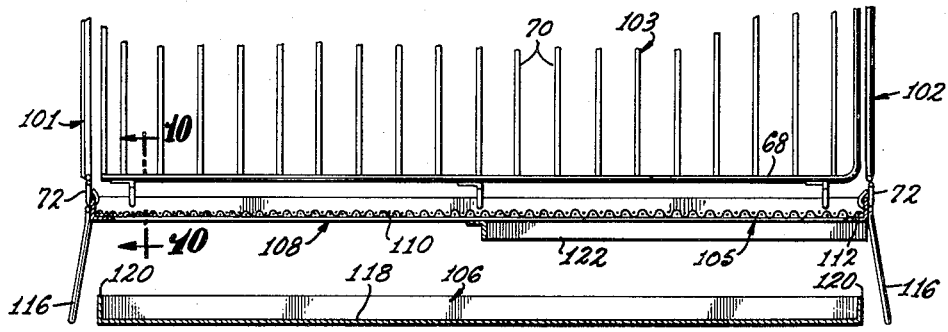
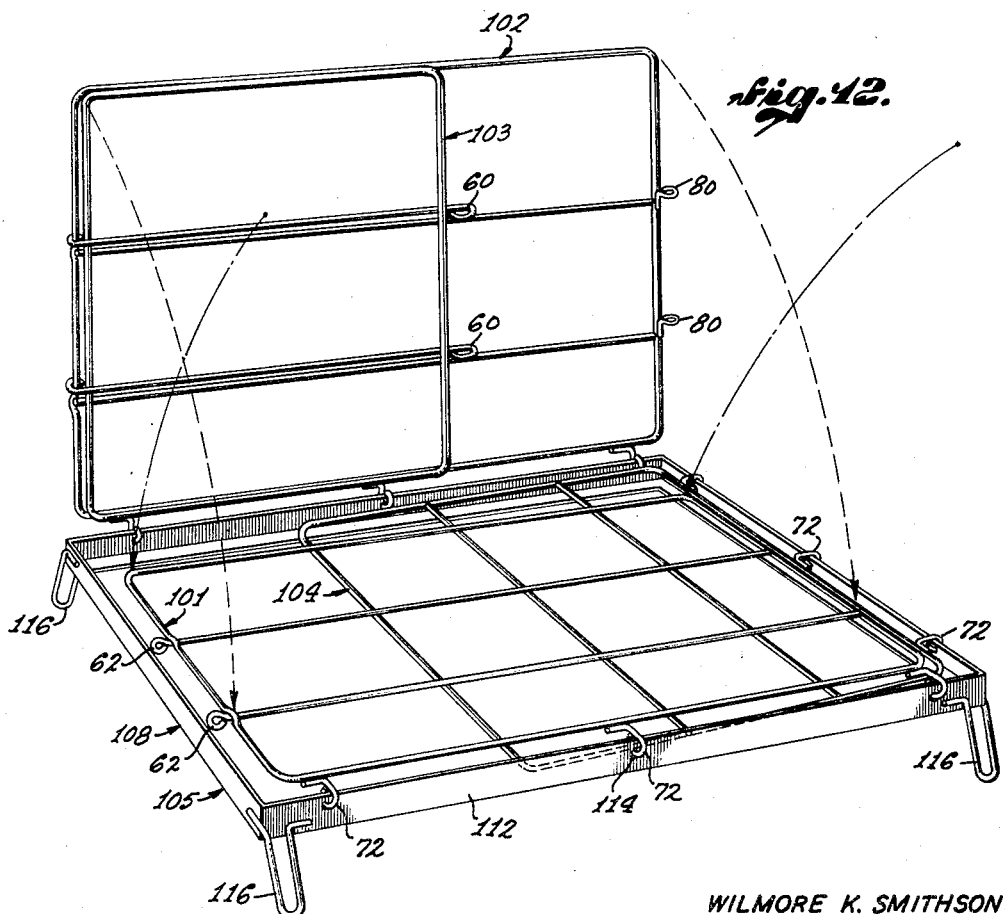
WILMORE K. SMITHSON,
INVENTOR.
HUEBNER, BEEHLER,
WORREL & HERZIG,
ATTORNEYS.

United States Patent Office 2,892,562
Patented June 30, 1959

2,892,562

FOLDABLE CAGE CONSTRUCTION

Wilmore K. Smithson, Los Angeles, Calif.

Application November 27, 1956, Serial No. 624,677

2 Claims. (Cl. 220—7)

This invention relates to cages or pens for small animals and more particularly to collapsible cages or pens adaptable for use as displaying, shipping and play cages or pens.

For many years breeders and handlers of small animals have been faced with the problem of satisfactory handling of animals, particularly dogs and cats. These animals are frequently shipped from one section of the country to another for show or breeding purposes, and frequently by the speediest means of transportation available such as by airliners or the like.

Shipping an animal in a cage by air presents several problems such as: excess weights, wherein the cost of shipping increases rapidly with the weight of the shipping crate; strength of the crate, as restriction of the freedom of the animal is of great importance; size of the crate when collapsed, as the cost of shipping an empty cage on its return journey as in the case of an animal that is shipped one way only increases with the bulk size of the crate. Sanitation is of great importance. Means must be provided to prevent discharges from the animals from falling through the floor of the cage to the floor on which it is resting, or on other objects which may be stored underneath the cage.

In animal shows, the exhibitor or handler is frequently faced with the need for a cage in which to display or "bench" the animal. During the period of time when the animal is not being shown in the judging area, it must be confined to a cage where it will be prevented from mixing with other animals, yet be readily viewed by the spectators. Very often space is very limited at such shows or in kennels, and cages must be stacked one upon the other. In this event, sanitation means must be provided to keep the animals in the lower cages clean.

The breeders of small animals are often faced with the problem of providing a confined area or enclosure for young animals to exercise and be displayed. Play pens with a sanitary bottom are a necessity but have in the past required a great deal of space in which to store the pen when not in use. Therefore, a collapsible pen as per my invention is very desirable and useful, one which will take a minimum of space to store when not in use, one which has sufficient strength and rigidity, and yet is light in weight for easier handling and is very readily collapsible.

Cages for small animals are well known to the art, but fail to meet the aforesaid needs of breeders and handlers inasmuch as most of them are not collapsible for storage, and are heavy and awkward to handle and are rather expensive.

It is therefore an object of this invention to provide an enclosure or cage for small animals that is strong, yet light in weight.

It is another object of this invention to provide a cage for small animals that is rigid when erected, yet fully collapsible.

It is a further object of this invention to provide a cage for small animals that is collapsible in a few seconds.

It is an object of this invention to provide a cage that is readily and securely stackable for show and kennel use.

Another object of this invention is to provide a cage that is easily kept clean.

A further object of this invention is to provide a cage that contains a disposable sanitary liner in its bottom.

An object of this invention is to provide a cage that is completely enclosed to prevent escape of said animals.

An important object of this invention is to provide a cage that is open at the top yet rigid when erected for use as a play pen for young animals.

A further object of this invention is to provide a cage that is equipped with a perforate bottom panel to prevent accumulation of animal eliminations, but one that is also provided with a pan underneath said cage to catch said eliminations.

An important object of this invention is to provide a cage with doors for easy access to the animals.

These and other objects of this invention will be apparent from the following description of the drawings wherein:

Figure 1 is a perspective view of a preferred form of a cage embodying this invention.

Figure 2 is an enlarged fragmentary perspective view of a portion of the cage shown in Figure 1 showing more clearly the locking means for one of the doors.

Figure 3 is an enlarged fragmentary sectional view as taken on line 3—3 of Figure 1.

Figure 4 is an enlarged fragmentary sectional view as taken on line 4—4 of Figure 1 including a linear which this invention anticipates.

Figure 5 is a schematic perspective view of the cage shown in partial collapsed position.

Figure 6 is a schematic perspective view similar to Figure 5 showing the cage in a fully collapsed position.

Figure 7 is a front elevational view of a pair of the cages of Figure 1 showing them in stacked relationship.

Figure 8 is a perspective view of another form of my invention to be used as a play pen.

Figure 9 is a fragmentary perspective view of a portion of the pen shown in Figure 8 showing a locking means.

Figure 10 is an enlarged fragmentary sectional view as taken on line 10—10 of Figure 11.

Figure 11 is a horizontal sectional view as taken on line 11—11 of Figure 8.

Figure 12 is a schematic perspective view of the form of pen in Figure 8 shown in a partially collapsed position.

Referring more particularly to the drawings there is illustrated by way of example but not limitation a cage 20 comprising sides 22, 23, top 24, bottom 26 and hinged end panels 28, 30 made of resilient wire grille. Sides 22, 23, top 24 and bottom 26 provide interconnected peripheral walls which define a compartment for the animal to be caged.

Sides 22, 23 preferably comprise a rectangular frame 32 of a heavy guage wire reinforced by longitudinal braces 34 and vertical wires 36 of a lighter guage. The ends of the braces 34 are preferably attached as by welding at spaced arcuate offsets 37 of the frame 32. Vertical members 36 are spaced laterally across the frame 32 and attached as by welding at the ends to the upper and lower rails of the frame 32 and to the braces 34 to form a rigid grille-like panel. The spacing between the vertical members is preferably such as to avoid catching an animal's feet but close enough to prevent the animal from being able to extend its head or muzzle through the wires.

The top 24 and the bottom 26 are similarly made of wire and consist of a plurality of cross braces 40 attached to the upper and lower rails of the frames 32 as by turned-back loops 42 at each thereof. Spaced longitudinal wires 44 may be secured to the braces 40 as by means of welding or the like. The spacing of the wires 44 is preferably the same as that of the vertical members 36 of frames 32.

The bottom 26 may be additionally provided with a floor panel 46 of solid material secured to the end cross braces 40 as by clips 48. The clips 48 extend downwardly and outwardly from said floor panel 46 and may be secured to the floor panel as by bolts 50, rivets or the like. Preferably a wing nut 52 is provided for easier removal of the flooring for cleaning or other purposes.

End panels 28, 30, which may be termed as doors, are also fabricated of wire materials. The panel 28 consists of upper and lower wire rails 54 hingedly secured to one of the side panels such as 22 as by turned-back looped ends 56. Intermediate wire rails 58 are provided with similar turned-back loops at the hinged end at the panel 22, and are additionally provided at their opposite ends with elongated loops 60 to provide locking engagement with horizontal loops 62 of the cross braces of the opposing panel 23. The elongated loop 60 is of sufficient length to encompass the loop 62 and is retained by pins 64. Pins 64 may be formed with eyes or loops at their upper ends for securement by chains 66 or the like to door 28 to prevent loss or misplacement. The door panel 28 is completed similarly to aforementioned panels by vertical wires 65.

The end panel 30 may also be termed as a door and is of similar wire construction with wire members 68 comprising the frame having vertical wires 70 welded thereto, but is preferably hinged in a different manner. In this instance a plurality of hinges 72 is provided at the bottom of the panel 30. Said hinges comprise an inverted L-shaped wire welded as by its short horizontal leg 74 to the underside of the lower rail of the door panel frame 68 and turned back at its longer vertical leg 76 to form a loop over the end rail or brace 40 of the bottom panel 26. The door panel 30 therefore folds downwardly along its lower edge. To secure the door panel 30 to the cage and further afford rigidness to the cage, securement means 78 are provided at each vertical edge of said panel and adjoining edges of the panels 22, 23. A pair of loop hinges or eyelets 80 are weldably attached to each adjoining vertical edge of panels 22, 23, and 30. The eyelets 80, see Figure 9, are spaced in overlapping relationship to form aligned apertures for an elongated locking or latching pin 82 said pin engaging both an upper and lower pair of eyelets 80.

An important feature of this embodiment of the invention is the spacing of the eyelets 80 with a slight interference with each adjoining eyelet resulting in an outwardly springing of the said adjoining vertical edges of the panels 22, 23, 30 in order to force the eyelets to overlap. This springing of the end members of the frames tends to cause a frictional grip of the eyelets 80 one against the other, and of the locking pin 82. This tight construction adds considerably to the rigidity of the entire cage, especially desirable while the opposing door 28 is unlatched. The locking pins 82 may be provided with short lengths of chain 84 for securement to the door panel 30 as in the pins 64.

As can be clearly seen by the foregoing description said end door panel 30 can be conveniently folded downwardly and inwardly for folding prior to collapsing the cage. Also it may be dropped outwardly to afford access to the interior of the cage or a ramp for use of the animal. When in its vertical position and secured by the lock pins 82, by means of springing the edge members, the end door panel adds considerable strength and rigidity to the cage.

To space the cage from the floor surface, legs 86 are provided. Legs 86 preferably comprise a U-shaped wire bent outwardly at its upper ends 88 secured as by welding to the lower rails of frames 32 of panels 22, 23. Of importance is the angle at which these legs depend. Preferably the legs are attached at a slightly outwardly extending relationship to the cage.

As best seen in Figure 7, the slight spreading of the legs 86 enables the stacking of the cages conveniently, locking one cage to the other. The legs of the upper cage straddle the top of the lower cage, affording a very stable stacking engagement.

In the event of the need to ship an animal in a cage or stacking as aforementioned, means must be provided to prevent eliminations of an animal from dropping through the cage. As shown in Figure 4, I have provided a lightweight liner such as a corrugated cardboard liner 89, comprising a bottom 90 with upturned sides and ends 91 into which a multiple layered disposable absorbent material 93 may be laid.

It will be readily seen by the foregoing description that although the cage 20 is of very rigid construction when erected with doors locked, it is readily collapsible in a few moments.

To accomplish this, first the pins 64 are removed from the door 28, and the pins 82 from the door 30. The door 28 is then folded inwardly against the inner surface of the panel 22. At this time the door 30 is folded inwardly against the floor panel 26. At this point the cage will be easily collapsed since all attachments between sides 22, 23, top 24, bottom 26 are secured together by means of looped ends 42 to form hinges. Therefore the uppermost edge rail 92 of panel 22 will flatten downwardly towards the lowermost edge rail 94 of panel 23. The edge rail 94 is provided with an S-shaped hook 96 closedly secured about the rail 94 and open at its other end 98 to receive the rail 92. The length of the hook 96 is such that the collapsed cage 20 must be compressed slightly to enable the end 98 to receive the rail 92. When hooked and the pressure released, the hook will frictionally hold the cage in collapsed position against inadvertent unhooking as by jarring or dropping or the like. It will be understood that by this method wherein the doors are folded inwardly and the entire boxlike structure collapsed, the cage occupies a minimum of space for storage when not in use.

To unfold the cage, a slight pressure is again exerted to the central portion of the collapsed cage to release the hook 98 from the rail 92. Slight pressure on the outside corners, opposite rails 92, 94 will erect the cage. The doors are then swung outwardly and locking pins 64, 82 inserted.

Figures 8 through 12 disclose another form of my invention wherein a collapsible play pen type of cage with a sanitary bottom is provided.

In Figure 8, pen 100 comprises vertical side panels 101, 102, end door panels 103, 104, a perforated bottom panel 105, and a removable pan 106. In this form the top is preferably open to provide access for attendance to young animals such as puppies or the like.

Side panels 101, 102 are similar in construction to side panels 22, 23 of cage 20, wherein the panels comprise wire frames 32, horizontal braces 34 and vertical wires 36. Door panels 103, 104 are similar in construction to doors 28, 30 wherein the panel 103 comprises a wire frame 68 and vertical wires 70, and the panel 104 comprises horizontal rails 54, 58 and vertical rails 65. I prefer again in this form to provide outwardly hinging of the door 103 with locking means such as loops 60, 62 and pins 64, and a downwardly hinging of the door 104 as by securement means 78 at each corner thereof.

In this form 100, I prefer to hinge the side panels 101, 102 and end panels 104 along the lowermost edge. For this purpose a plurality of loops 72 are provided.

The bottom panel 105 shown comprises a frame 108, and a large mesh screen floor section 110. I have found that a very satisfactory screen floor can be made up of common ½-inch hardware cloth. The frame may consist of opposing angle members 112 joined as at the corners with one leg of the member extending upwardly and the other leg extending inwardly to support the perforate screen floor 110. Spaced apertures 114 are provided in the vertical leg of the angle member for hinge members 72. A diagonal brace member 122 may be provided, extending from opposite corners of the frame 108 on the underside thereof to provide support for the wire floor 110.

Extending downwardly and outwardly at a slight angle are legs 116 weldably attached to the frame 108 as at the corners thereof. It will be apparent from the description of the cage 20 that said legs 116 will adapt themselves to locking cages in a stacked relationship. For easier cleanability, a shallow pan 106 may be supplied with a solid floor 118 and upturned sides 120. Preferably the pan is slightly smaller than the dimensions of the frame 108 to nest therewith when the pen is in the collapsed condition. It will be apparent that the pan may be easily removed from underneath the cage for cleaning purposes.

For stacking purposes a top (not shown) similar to the top of cage 20 may be provided to support the pan 106.

Of utmost importance in this form 100 of my invention, is the springing of the end members of the adjoining edge members of the panels 101, 102, and 104 in the securement at 78 to afford maximum strength and rigidity to the pen.

A very desirable feature of this invention is the ease in collapsing the pen for storage or packaging.

As shown in Figure 12, the pins 64 are removed, and the door 103 is pivoted inwardly against the inner surface of the panel 102. The pins 82 are removed and the door 104 is pivoted downwardly against the upper surface of the bottom panel 105. Next, the panel 101 is pivoted downwardly atop of panel 104. Lastly, the panel 102 together with door 103 is pivoted downwardly atop of panel 101. All panels are of such dimensions as to fit loosely within the confines of the bottom 105. If desired, further compactness may be obtained by placing the pan 106 on top of the bottom 105 before folding down the door and side panels.

It will be seen that this invention features the provision of appropriate apparatus for conveniently displaying and shipping small animals and provides convenient collapsing means for storage of the apparatus.

While I have herein shown and described what I conceive to be the most desired form of this invention, it is to be understood that alterations and modifications thereof may be made in a manner to satisfy the spirit of the invention which is intended to comprehend any and all equivalent devices in accordance with the spirit thereof and as comprehended in the following claims.

Having described my invention, what I claim as new and desire to secure by Letters Patent is:

1. A collapsible, foldable, wire cage for animals comprising in combination: a plurality of interconnected wire, grille-type, peripheral walls defining a compartment, each peripheral wall having a pair of parallel, opposite edges, one of said edges of each pair being hingedly connected to a juxtaposed edge of a contiguous peripheral wall; and a pair of opposed end walls for said compartment, each end wall being hingedly connected to one of said peripheral walls and having an area less than the cross-sectional area defined by said peripheral walls and adapted to be folded within said compartment, each of said end walls including a pair of transverse wire elements each provided with an eyelet projecting from one edge thereof in the plane of the end wall, said peripheral wall adjacent to said eyelets having a pair of transverse wire elements each provided with a generally circular eye projecting beyond the edge thereof and through the eyelet of the end wall wire element, whereby said circular eye cooperates with said eyelet to retain said end wall in closed position, the edge portions of said adjacent peripheral wall being resiliently urged inwardly to position the circular eye in the eyelet of the end wall, and a locking pin received in each of the circular eyes of the wire elements of the peripheral walls.

2. A wire cage as stated in claim 1 wherein opposed peripheral walls are provided with depending legs at each lower corner inclinded slightly outwardly from the plane of the said opposed peripheral walls continguous thereto for stacking one cage upon another cage.

References Cited in the file of this patent

UNITED STATES PATENTS

| 609,612 | Deveau | Aug. 23, 1898 |
| 992,189 | Griffin | May 16, 1911 |
| 1,129,011 | Pyle | Feb. 16, 1915 |
| 1,905,137 | Blomberg | Apr. 25, 1933 |
| 1,973,952 | Golberg | Sept. 18, 1934 |

FOREIGN PATENTS

| 392,779 | France | Dec. 4, 1908 |